Feb. 15, 1938.                    W. TAPLEY                    2,108,695
                          PENDULUM CONTROL INSTRUMENT
                              Filed Feb. 26, 1937
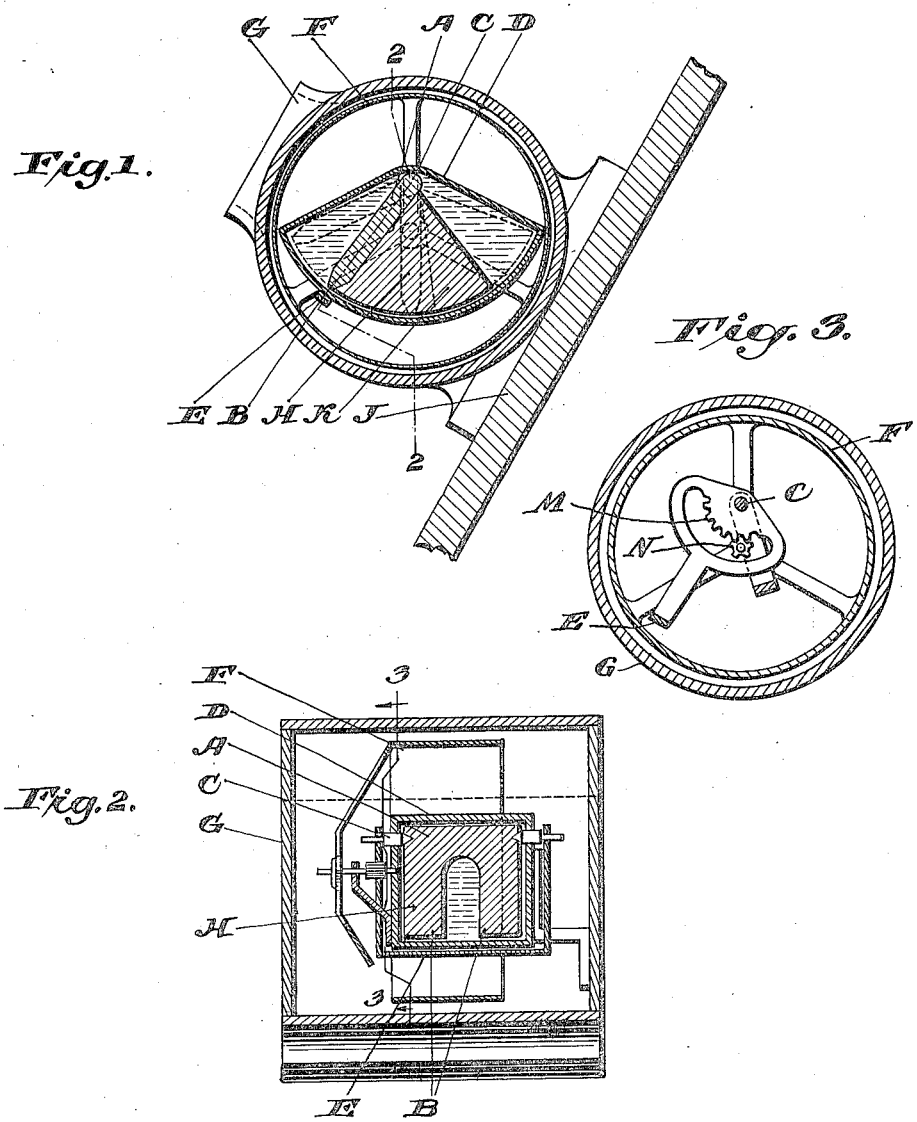
Inventor
William Tapley Patented Feb. 15, 1938

2,108,695

UNITED STATES PATENT OFFICE 2,108,695

PENDULUM CONTROL INSTRUMENT

William Tapley, Totton, Southampton, England

Application February 26, 1937, Serial No. 128,036
In Great Britain March 5, 1936

2 Claims. (Cl. 264—1)

My present invention relates to instruments, such as gradient, acceleration and like meters, in which the indications are controlled by the movements of a magnetic pendulum. The controlling pendulum is usually enclosed in a damping box containing liquid, and operates the indicating mechanism by its magnetic attraction to an exterior armature. An instrument of this type was patented by me in Great Britain under No. 21,517 of 1910.

Mechanical connection is made between the armature and either, a moving scale, or pointer, by which the indications of the relative position of the enclosed pendulum are given.

Instruments of this type are more particularly designed for mounting on mechanically propelled road and rail vehicles, ships, and aeroplanes, and it is frequently necessary to mount such instruments on or in the proximity of ironwork. When mounted in such positions there is liability for the magnetic pendulum to be attracted out of its normal position which it would otherwise take up under the action of gravity or acceleration.

My present invention consists in an improved arrangement whereby the normal position of the poles of the magnetic pendulum are displaced so that they lie in a position remote from the back of the instrument, or from that part of the instrument which is liable to be in the proximity of ironwork. My invention is of particular value in the case of instruments of small dimensions, where, without my arrangement, errors in indications are caused by the very close proximity of any iron upon which such small instruments may be mounted.

This invention will be best understood from a consideration of the following detailed description, in view of the accompanying drawing forming a part of the specification; nevertheless, it is to be understood that the invention is not confined to the disclosure, being susceptible of such changes and modifications as define no material departure from the salient features of the invention as expressed in the appended claims.

In the drawing:

Figure 1 is a vertical cross section of an instrument indicating by means of a revolving scale;

Figure 2 is a section taken along the line 2—2 of Figure 1.

Figure 3 is a vertical section taken along the line 3—3 of Fig. 2.

In this drawing, the controlling magnetic pendulum, shown by the full lines at A, consists of a horseshoe shaped magnet having its magnetic poles at B. The pendulum is supported on centres at C, upon which it can swing freely.

The magnetic pendulum A, is entirely enclosed in a damping box D which box contains liquid for the purpose of damping out erratic oscillations. Outside the damping box, and supported on the same centres as the pendulum, the armature E takes up a position by magnetic attraction from the pendulum, and thereby indicates the position in which the pendulum lies at any time. By means of suitable gearing M and N the position of the armature is indicated to an observer by means of a revolving scale shown at F. The indication of the scale being seen through an opening in the outer case at G. A detailed arrangement of the indicating mechanism has been omitted as it forms no part of my invention, and it is to be understood that such mechanism may be of any type, and may operate a pointer in place of the moving scale shown.

In instruments controlled by a magnetic pendulum, it is usual to employ a horseshoe shaped magnet suspended on centres so that, under the action of gravity, it hangs with its magnetic poles vertically below the point of suspension. A pendulum in such position is shown in Fig. 1 at H. From this normal position, the pendulum, during the operation of the instrument, may swing toward the support on which the instrument is mounted, and if this support is of magnetic material, the pendulum may be attracted to it and consequently give a false indication. In Fig. 1 the instrument is shown mounted on a sloping iron support J, and it will be clear that, especially in an instrument of small dimensions, the magnetic poles of the pendulum would come in close proximity to the support. Since magnetic attraction increases inversely as the square of the distance, the attraction to a magnetic substance may be the cause of serious error.

My invention consists in the addition to the pendulum of a heavy non-magnetic mass of material, such, for instance, as lead, fixed in such a position that under the normal action of gravity the magnetic poles of the pendulum hang in a position remote from the exterior source of magnetic attraction. In Fig. 1 this additional heavy mass is shown at K, and it results in causing the magnetic pendulum to take up a normal position, under the action of gravity, as shown at A.

From this position the poles of the magnetic pendulum do not approach the support J nearly enough to be affected by magnetic attraction thereto.

It is to be understood that the mass of the counterbalance is not for the purpose of counteracting magnetic attraction but is added solely to cause the magnetic poles to take up a position remote from the disturbing effect of the magnetic attraction. The combined masses of the counterweight and magnet together form the operating pendulum and the scale is calibrated to read zero and this combined mass hangs normally vertically.

In the case of an instrument mounted flush in an iron plate, attraction is towards the front of the instrument, and I then affix the additional heavy mass to the opposite side of the pendulum, causing it to take up a normal position, with its poles toward the back of the instrument and remote from the disturbing attraction of the mounting plate.

By simply altering the weight and position of the additional mass affixed to the pendulum I can arrange to have the magnetic poles in any position desired. By this means therefore my invention allows for the production of instruments which are unaffected by exterior magnetic attraction.

I claim:

1. In an instrument operated by movements of a magnetic pendulum relative to a fixed element of the instrument, a non-magnetic mass attached to the magnetic pendulum for causing the pendulum to assume positions under the action of gravity that the magnetic poles of said pendulum will, throughout their movements, be retained remote from any exterior magnetic substance near or upon which the instrument may be mounted.

2. In an instrument operated by movements of a magnetic pendulum relative to a fixed element of the instrument, a mass of non-magnetic material connected to the pendulum for simultaneous oscillation, said mass under the action of gravity adapted to counterbalance the weight of the pendulum and maintain the magnetic poles of the pendulum, throughout its movements, remote from any exterior magnetic substance near or upon which the instrument may be mounted.

WILLIAM TAPLEY.